US011977485B2

(12) United States Patent
Chen

(10) Patent No.: US 11,977,485 B2
(45) Date of Patent: May 7, 2024

(54) METHOD OF CACHE MANAGEMENT BASED ON FILE ATTRIBUTES, AND CACHE MANAGEMENT DEVICE OPERATING BASED ON FILE ATTRIBUTES

(71) Applicant: SAMSUNG ELECTRONICS CO., LTD., Suwon-si (KR)

(72) Inventor: Zhonggang Chen, Shaanxi (CN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/680,400

(22) Filed: Feb. 25, 2022

(65) Prior Publication Data

US 2022/0365876 A1 Nov. 17, 2022

(30) Foreign Application Priority Data

May 13, 2021 (CN) .......................... 202110521854.4

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01); *G06F 2212/72* (2013.01)

(58) Field of Classification Search
CPC ............. G06F 12/0246; G06F 12/0802; G06F 12/0862; G06F 2212/60; G06F 2212/72
See application file for complete search history.

(56) References Cited

U.S. PATENT DOCUMENTS

| 5,257,370 | A | 10/1993 | Letwin |
| 6,973,542 | B1 | 12/2005 | Schmuck et al. |
| 7,085,891 | B2 | 8/2006 | Trevathan |
| 7,676,630 | B2 | 3/2010 | Qiao |
| 8,356,026 | B2 | 1/2013 | Heimendinger |
| 9,817,840 | B1 | 11/2017 | Emelyanov et al. |
| 10,152,274 | B2 | 12/2018 | Li et al. |
| 10,725,922 | B2 | 7/2020 | Li et al. |
| 11,366,599 | B2 | 6/2022 | Yoo et al. |
| 2018/0024924 | A1 | 1/2018 | Winkler |
| 2019/0109926 | A1 | 4/2019 | Hotchkies et al. |
| 2020/0128097 | A1 | 4/2020 | Zhang et al. |
| 2020/0250132 | A1* | 8/2020 | Ramsden ............. G06F 16/128 |
| 2020/0257628 | A1 | 8/2020 | Fang et al. |
| 2020/0334156 | A1* | 10/2020 | Brand .................. G06F 16/172 |
| 2022/0094738 | A1 | 3/2022 | Zhang et al. |

(Continued)

FOREIGN PATENT DOCUMENTS

| CN | 105393228 A | 3/2016 |
| CN | 105892937 A | 8/2016 |
| CN | 107784108 A | 3/2018 |

(Continued)

*Primary Examiner* — Shawn X Gu
(74) *Attorney, Agent, or Firm* — Fish & Richardson P.C.

(57) ABSTRACT

A method of cache management includes: acquiring attributes of at least one file currently opened; extracting a first attribute subset related to a predetermined analysis target from among the attributes of the at least one file; determining region numbers of corresponding universal flash storage (UFS) device storage regions to be cached, based on the first attribute subset; and caching data of the corresponding UFS device storage regions to be cached into a cache memory, based on the region numbers.

15 Claims, 7 Drawing Sheets

(56) References Cited

U.S. PATENT DOCUMENTS

2022/0244869 A1* 8/2022 Kanteti ................ G06F 3/0631

FOREIGN PATENT DOCUMENTS

| CN | 110221782 A | 9/2019 |
|----|-------------|--------|
| CN | 110471894 A | 11/2019 |
| CN | 111309650 A | 6/2020 |
| CN | 111782612 A | 10/2020 |
| CN | 111984602 A | 11/2020 |
| CN | 112783437 A | 5/2021 |

* cited by examiner

METHOD OF CACHE MANAGEMENT BASED ON FILE ATTRIBUTES, AND CACHE MANAGEMENT DEVICE OPERATING BASED ON FILE ATTRIBUTES

CROSS-REFERENCE TO THE RELATED APPLICATION

This U.S. Non-Provisional patent application claims priority under 35 U.S.C. § 119 to Chinese Patent Application No. 202110521854.4, filed on May 13, 2021 in the Chinese Patent Office, the disclosure of which is incorporated herein by reference in its entirety.

TECHNICAL FIELD

The present application relates to data storage, and in particular, to a method of cache management based on file attributes and a cache management device operating based on file attributes.

BACKGROUND

A universal flash storage host performance booster (UFS HPB) cache memory is usually added in a universal flash storage (UFS) driver layer. The UFS driver layer may improve the read performance of a UFS device through a simple adding algorithm and an elimination algorithm. Here, the adding algorithm may add data to the cache memory, such as always when data is accessed or upon reaching a certain access threshold for data that is accessed. The elimination algorithm may eliminate date from the cache memory and may be, for example, a least recently used (LRU) elimination algorithm, a least frequently used (LFU) elimination algorithm, etc.

A hit rate of the cache memory depends on the collocation of the adding algorithm and the elimination algorithm. However, adding algorithms tend to be too simple, such that if the data added to the cache memory is not appropriate, it will lead to frequent elimination by the elimination algorithm, resulting in low utilization of cache memory resources and reduction of the cache memory hit rate.

SUMMARY

According to an exemplary embodiment of the present disclosure, a method of cache management based on file attributes includes: acquiring attributes of at least one file currently opened; extracting a first attribute subset related to a predetermined analysis target from among the attributes of the at least one file; determining region numbers of corresponding universal flash storage (UFS) device storage regions to be cached, based on the first attribute subset; and caching data of the corresponding UFS device storage regions to be cached into a cache memory, based on the region numbers.

According to another exemplary embodiment of the present disclosure, a cache management device operating based on file attributes includes: a file monitoring unit for acquiring attributes of at least one file currently opened; a file attribute analysis unit for extracting a first attribute subset related to a predetermined analysis target from among the attributes of the at least one file; a region determination unit for determining region numbers of corresponding universal flash storage (UFS) device storage regions to be cached, based on the first attribute subset; and a cache unit, for caching data of the corresponding UFS device storage regions to be cached into a cache memory, based on the region numbers.

According to another aspect of the present disclosure, an electronic apparatus includes a storage on which computer executable instructions are stored, and a processor that executes the instructions. When the instructions are executed by the processor, the electronic apparatus performs a method of cache management based on file attributes, including: acquiring attributes of at least one file currently opened; extracting a first attribute subset related to a predetermined analysis target from among the file attributes of the at least one file; determining region numbers of corresponding universal flash storage (UFS) device storage regions to be cached in a UFS device, based on the first attribute subset; and caching data of the corresponding UFS device storage regions to be cached into a cache memory, based on the region numbers.

Other aspects and/or advantages of the general concept of the disclosure will be described partly in the following description, and another part will be clear through the description or may be known through the implementation of the general concept of the disclosure.

BRIEF DESCRIPTION OF THE DRAWINGS

The above and other objects and features of the present disclosure will become more apparent, from the following detailed description in combination with the drawings, wherein.

DETAILED DESCRIPTION

Figure 1:
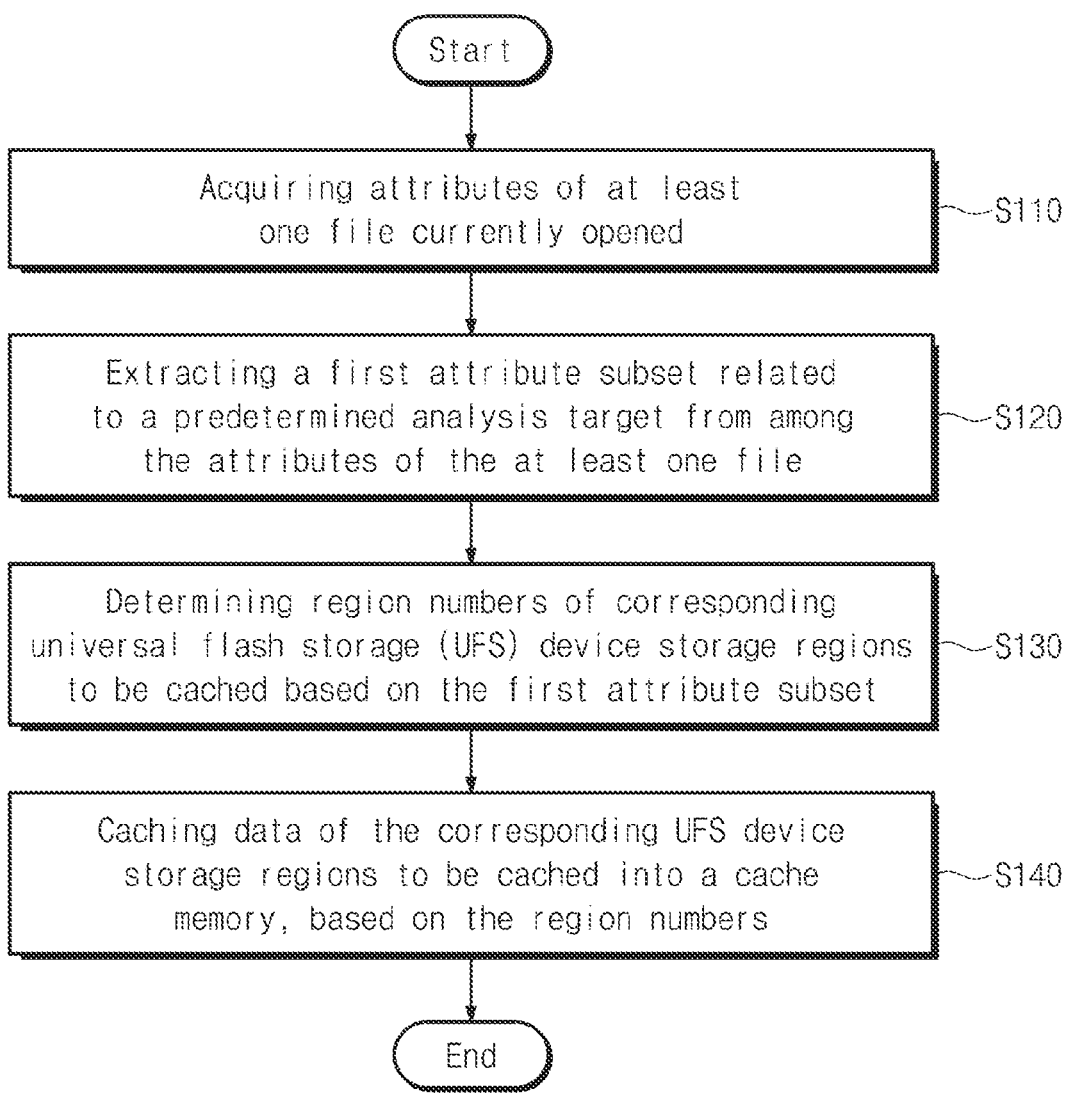
FIG. 1 is a flowchart illustrating a method of cache management based on file attributes, according to an exemplary embodiment of the present disclosure.

Embodiments of the present disclosure are now referred to in detail, and examples of the embodiments are shown in the drawings, wherein the same reference numerals always refers to the same parts. The embodiments will be described below with reference to the drawings, in order to explain the present disclosure.

A system may consist of a UFS device and and operating system. The operating system may include an application, a virtual file system (VFS), an original block I/O, a file system, a block layer and a UFS driver layer, etc. An example of an operating system is a Linux operating system that includes a Linux kernel as the core interface between a computer system's hardware and processes. The application may access the UFS device through the original block I/O in a form of an original data block, or may access the UFS device through the file system in a form of a file, so as to perform various operations on files in the UFS device. The VFS is a virtualized and unified interface for managing files for different file systems. An index node (inode) of a file in the UFS device may be queried through VFS. The block layer is a common module which may be used to perform common operations on the UFS device. The UFS driver layer manages UFS HPB cache memory through various algorithms. Algorithms used for caching data to the UFS HPB cache memory may be improved according to the teachings herein. An algorithm strategy of entering UFS HPB cache memory by mining data features may be dynamically generated. The algorithm strategy may include preemptive caching data of currently open files as described herein. Dynamic generation of an algorithm strategy will be described in detail below.

FIG. 1 is a flow chart illustrating a method of cache management based on file attributes, according to an exemplary embodiment of the present disclosure.

Referring to FIG. 1, at step S110, attributes of at least one file which is/are currently opened may be acquired. Here, the attributes of the file(s) may include at least one of a file self attribute and a file event attribute. Using these file attributes, accuracy of the elimination algorithm may conform to the current file condition of the system, and therefore be improved. A file attribute table including at least one of the file self attribute and the file event attribute may be created. The attributes of the at least one file which is/are currently opened may be recorded in the file attribute table. In addition, the at least one file which is/are currently opened may be monitored and the attributes in the file attribute table may be updated.

More specifically, each file may correspond to one inode, which stores information on the file self attribute. Examples of file self attributes include the number of bytes of the file, a user ID of the file owner, a group ID of the file, a read permission of the file, a write permission of the file, an execution permission of the file, location(s) of one or more data block(s) of the file, a time stamp of the file etc., but the teachings of the present disclosure are not limited to these examples of file self attributes. Examples of the time stamp of the file include ctime, which may represent the last change time of the inode of the file; mtime, which may represent the last change time of the file content; and atime, which may represent the last open time of the file. The inode of the file in the UFS device may be queried by the VFS in the operating system. In addition, as an example only but not a limitation, examples of file event attributes may include the following events:

IN_ACCESS/*File was accessed*/
IN_MODIFY/*File was modified*/
IN_ATTRIB/*Metadata was changed*/
IN_CLOSE_WRITE/*Writable file was closed*/
IN_CLOSE_NOWRITE/*Unwritable file was closed*/
IN_OPEN/*File was opened*/
IN_MOVED_FROM/*File was moved from . . . */
IN_MOVED_TO/*File was moved to . . . */
IN_Create/*Subfile was created*/
IN_Delete/*Subfile was deleted*/
IN_DELETE_SELF/*Self was deleted*/
IN_MOVE_SELF/*Self was moved*/

In addition, since the inode number of the file uniquely corresponds to the file on a one-to-one basis, the inode number may be used as the ID for the file in the above file attribute table. Table 1 shows a file attribute table, according to an exemplary embodiment of the present disclosure. Although the file attribute table shown in Table below only includes the file event attribute, the file attribute tables described according to the present disclosure are not limited thereto.

TABLE 1

| event type | Inode1 | Inode2 | Inode3 | Inode4 | Inode5 | Inode6 | Inode7 | Inode8 |
|---|---|---|---|---|---|---|---|---|
| accessed | 200 | 100 | 112 | 130 | 130 | 112 | 88 | 96 |
| modified | 130 | 130 | 130 | 130 | 130 | 130 | 130 | 130 |
| metadata changed | 50 | 0 | 13 | 21 | 5 | 53 | 11 | 32 |
| writable closed | 6 | 0 | 160 | 0 | 64 | 0 | 23 | 6 |
| unwritable closed | 0 | 0 | 0 | 0 | 0 | 0 | 0 | 0 |
| opened | 20 | 13 | 33 | 25 | 65 | 22 | 14 | 5 |
| moved from | 45 | 20 | 71 | 34 | 27 | 2 | 9 | 3 |
| moved to | 53 | 0 | 13 | 2 | 8 | 7 | 21 | 34 |
| created | 49 | 20 | 120 | 35 | 56 | 21 | 3 | 6 |
| deleted | 0 | 13 | 100 | 100 | 20 | 33 | 78 | 63 |
| deleted self | 0 | 25 | 0 | 5 | 0 | 9 | 7 | 1 |
| moved self | 0 | 44 | 13 | 47 | 68 | 45 | 0 | 2 |

Figure 2:
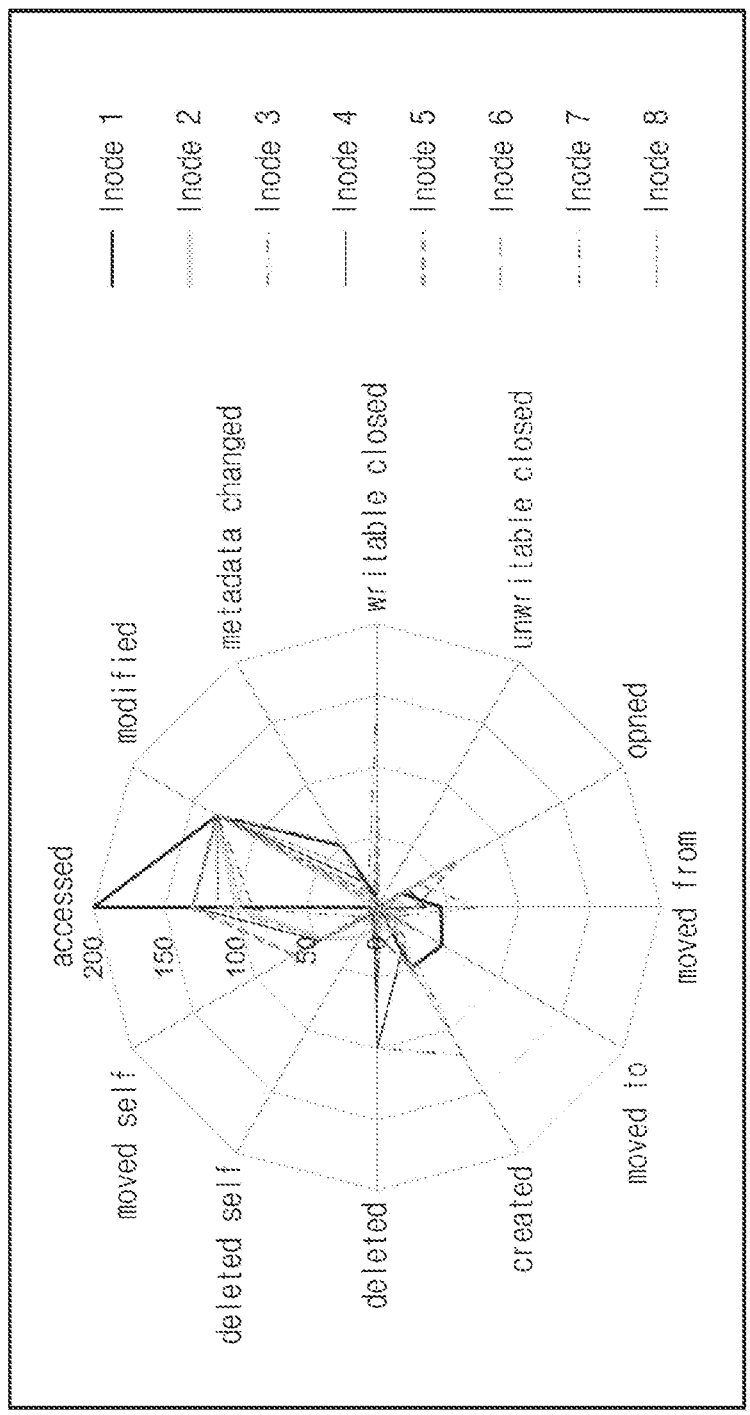
FIG. 2 is a schematic diagram illustrating a file access mode, according to an exemplary embodiment of the present disclosure.

At step S120, a first attribute subset related to a predetermined analysis target may be extracted from among the attributes of the at least one file. As an example only rather than a limitation, the predetermined analysis target may be a file reading heat, a file modification heat, etc., and the first attribute subset may be a subset of the attributes of the at least one file. File reading heat may reflect the frequency of reading a file. File modification heat may reflect the frequency of modifying a file. Attributes of the at least one file include open, access, modify, close, delete, etc. As an example only rather than a limitation, the attributes may be acquired from an inode of a file using tools provided by the Linux kernel or other methods. For example, the attributes of the file may be updated in the inode on an ongoing basis as the file is processed and stored. FIG. 2 is a schematic diagram illustrating a file access mode, according to an exemplary embodiment of the present disclosure. Here, the first attribute subset may reflect the file access mode, as shown in FIG. 2.

A UFS device may include memory physically and/or logically divided into storage regions. Region numbers may be assigned to the storage regions, and files may be mapped to the storage regions. At step S130, region numbers of corresponding UFS device storage regions to be cached may be determined based on the first attribute subset of the attributes of the at least one file. In particular, data of the at least one file is stored in the corresponding UFS device storage regions. The first attribute subset may be used to determine region numbers of the corresponding UFS device storage regions which store the data, so that the data in the corresponding UFS device storage regions may be cached. As an example, the corresponding UFS device storage regions may be determined for data for a file which is frequently opened or frequently accessed. Therefore, automatic identification of data to be cached in a dynamic file access mode may be implemented by automatically managing UFS device storage regions under a variable load.

Moreover, the step of determining the region numbers of the corresponding UFS device storage regions to be cached may further include: determining a second attribute subset of corresponding UFS device storage regions based on the first attribute subset, clustering the corresponding UFS device storage regions to at least one cluster based on the second attribute subset, and determining region numbers of the UFS device storage regions in a predetermined number of clusters with a high clustering center value as the region numbers of the corresponding UFS device storage regions to be cached.

As an example only rather than a limitation, the predetermined analysis target may be the file reading heat, and the step of clustering may be performed by using a K-means algorithm. An elimination algorithm may be optimized using these features, such as when using the file reading heat of data in storage regions corresponding to an open file. When considering which data/storage regions to store in the cache memory and which data/storage regions to eliminate from the cache memory, dynamic use of attributes of one or more open file(s) in the cache memory storage process may improve utilization of the cache memory resource and cache hit rate may be improved compared with existing elimination algorithms. In addition, unlike the first attribute subset for file attribute, the second attribute subset may be an attribute for the UFS device storage region. The above step of determining the second attribute subset based on the first attribute subset may be based on converting the file attribute into the attribute of the UFS device storage region for storing the file. That is, attributes of UFS device storage regions in the second attribute subset may be based on attributes of files in the first attribute subset, so that one or more attribute(s) of each storage region of the UFS device storage may be based on attributes of one or more file(s) stored in the storage regions). The second attribute subset may include the number of files in the UFS device storage region, the number of read input output (IO) times of files in the UFS device storage region, and a cache probability estimation $e^{(-avg\_file\_size)}$ of the average file size in the UFS device storage region. It should be understood that the above example of the second attribute subset is not limited to those listed. Those skilled in the art may adopt other attributes of the UFS device storage region, such as open, access, modify, close, delete, etc. of any file with data specifically stored in the UFS device storage region. Similarly, a cache probability estimation $e^{(-file\_size)}$ may be constructed based on the file size of the file with data stored in the UFS device storage region since a small file is preferred to be cached rather than a large file when the small file and the large file have the same access frequency, etc.

Figure 3:
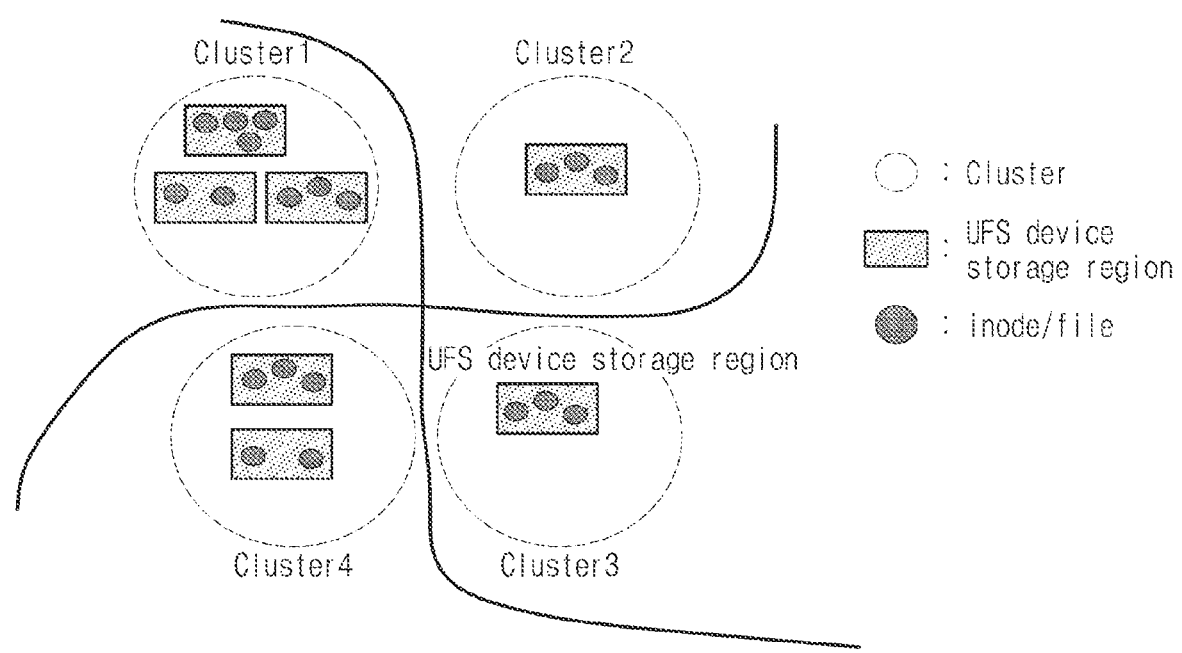
FIG. 3 is a schematic diagram illustrating clustering, according to an exemplary embodiment of the present disclosure.

FIG. 3 is a schematic diagram illustrating clustering, according to an exemplary embodiment of the present disclosure. In FIG. 3, it is assumed that the second attribute subset includes the attributes described above, that is, the number of files in the UFS device storage region, the number of read input output (IO) times of files in the UFS device storage region, and the cache probability estimation of the average file size in the UFS device storage region. Accordingly, the UFS device storage region may have three attributes as described above respectively. Then, the UFS device storage region is clustered based on these attributes of the UFS device storage region. It is assumed that four clusters are obtained as shown in FIG. 3, that is, cluster 1, cluster 2, cluster 3 and cluster 4. Here, each cluster may define the above-described three attributes differently. For example, cluster 1 may include a UFS device storage region in which the number of files in the UFS device storage region is greater than a first predetermined value, the number of read input output (IO) times of the files in the UFS device storage region is greater than a second predetermined value, and the cache probability estimation of the average file size in the UFS device storage region is greater than a third predetermined value. If the clustering center value of the predetermined number of clusters (such as cluster 1 and cluster 2) is high, the region number of the UFS device storage region in cluster 1 and cluster 2 may be determined as the region number of the corresponding UFS device storage region to be cached. It should be noted that the number of attributes in the second attribute subset, the predetermined number of clusters, etc. described above are all examples, and those skilled in the art may change them according to actual needs.

Figure 4:
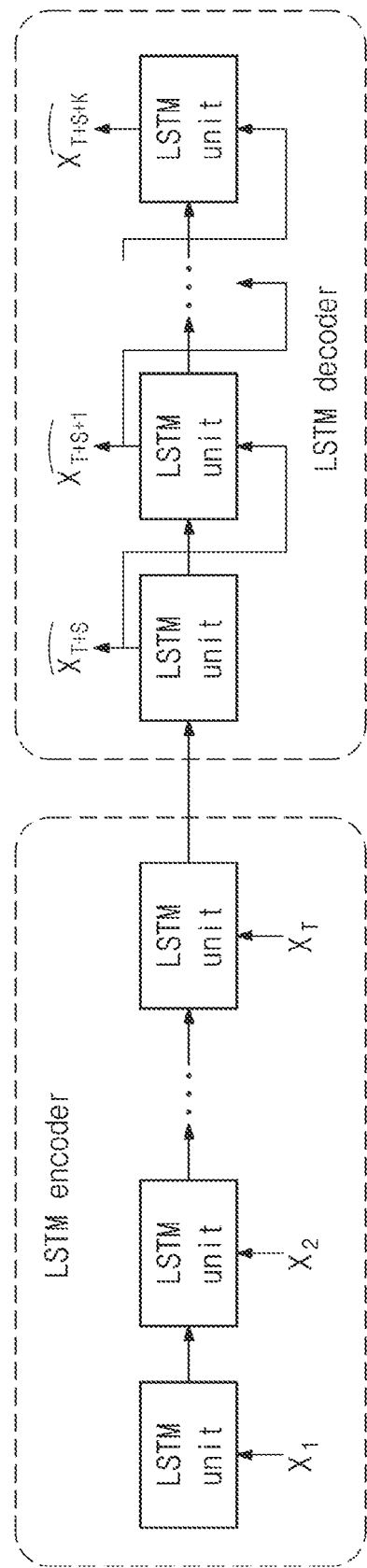
FIG. 4 is a schematic diagram illustrating a Long Short-Term Memory (LSTM) network, according to an exemplary embodiment of the present disclosure.

On the other hand, it should be understood that the region number of the UFS device storage region with a high file reading heat may be determined by using various ways, such as prediction, in addition to clustering. FIG. 4 is a schematic diagram illustrating an LSTM network, according to an exemplary embodiment of the present disclosure. As shown in FIG. 4, the input to the layers in the LSTM encoder is a sequence of the UFS device storage region accessed at time T, and the output from the layers of the LSTM decoder is a sequence of K UFS device storage regions after time S. That is, an access sequence of the UFS device storage region within a past predetermined time window is input to the LSTM encoder to output from the LSTM decoder a sequence of the UFS device storage region to be accessed within a future predetermined time window. An element value in the access sequence is a three-dimensional vector, such as the number of files in the UFS device storage region, the number of read input output (I/O) times of files in the UFS device storage region, and the cache probability estimation $e^{(-avg\_file\_size)}$ of the average file size in the UFS device storage region according to an exemplary embodiment of the present disclosure. The region number of the UFS device storage region identified in the output from the LSTM network is the region number of the UFS device storage region with high file reading heat. Therefore, the access sequence of the UFS device storage region within the future time window may be predicted according to historical access pattern(s) of the UFS device storage region.

Returning to FIG. 1, at step S140, data of the corresponding UFS device storage regions to be cached may be cached into the cache memory based on the region numbers. Here, the data of the corresponding UFS device storage regions to be cached based on the region number may be understood as address information of the UFS device storage regions corresponding to the region numbers. The address information may include or be based on a mapping table of a physical address and a logical address of the UFS device storage region.

More specifically, as an example only rather than a limitation, the cache memory may be the universal flash memory host performance booster (UFS HPB) cache memory. In addition, the step of caching the data of the corresponding UFS device storage regions to be cached into the cache memory may further include: generating, by the UFS driver layer, a region prefetching command in the UFS HPB cache memory based on the region numbers of the corresponding UFS device storage regions to be cached, and dispatching the region prefetching command to the UFS device, After the prefetching command is received, the data may be dispatched to the UFS driver layer by the UFS device based on the region prefetching command, and the data may be stored into the UFS HPB cache memory by the UFS driver layer. Therefore, the prefetching work of the UFS device storage region for various workloads may be automatically managed without modifying an application or even the Linux kernel. In the case of using the UFS driver layer containing HPB characteristics, no change to the Linux kernel is required. In addition, in a predetermined case such as when the cache memory is full or the number of the UFS device storage region cached in the cache memory reaches the upper limit, the region number of the corresponding UFS device storage region to be cached may be dispatched to the UFS driver layer. A form of a region list may be used. Data which has been cached into the UFS HPB cache memory may be eliminated by the UFS driver layer by using the data based on a predetermined elimination algorithm. Here, as an example only rather than a limitation, the predetermined elimination algorithm may be at least one of the least recently used (LRU) elimination algorithm and least frequently used (LFU) elimination algorithm. Further, as an example only rather than a limitation, the above operations performed by the UFS driver layer may be performed by the HPB driver in the UFS driver layer.

In addition, in the above steps, as an example only rather than a limitation, the region number of the UFS device storage region corresponding to the file may be obtained. The following Table 2 is a statistical table showing a file size distribution such as of an Android system.

TABLE 2

| file_size | [0, 4k] | (4k, 32k] | (32k, 256k] | (256k, 4M] | (4M, 32M] | (32M, 256M] |
|---|---|---|---|---|---|---|
| Total | 10642 | 4456 | 2473 | 1286 | 120 | 27 |

Figure 5:
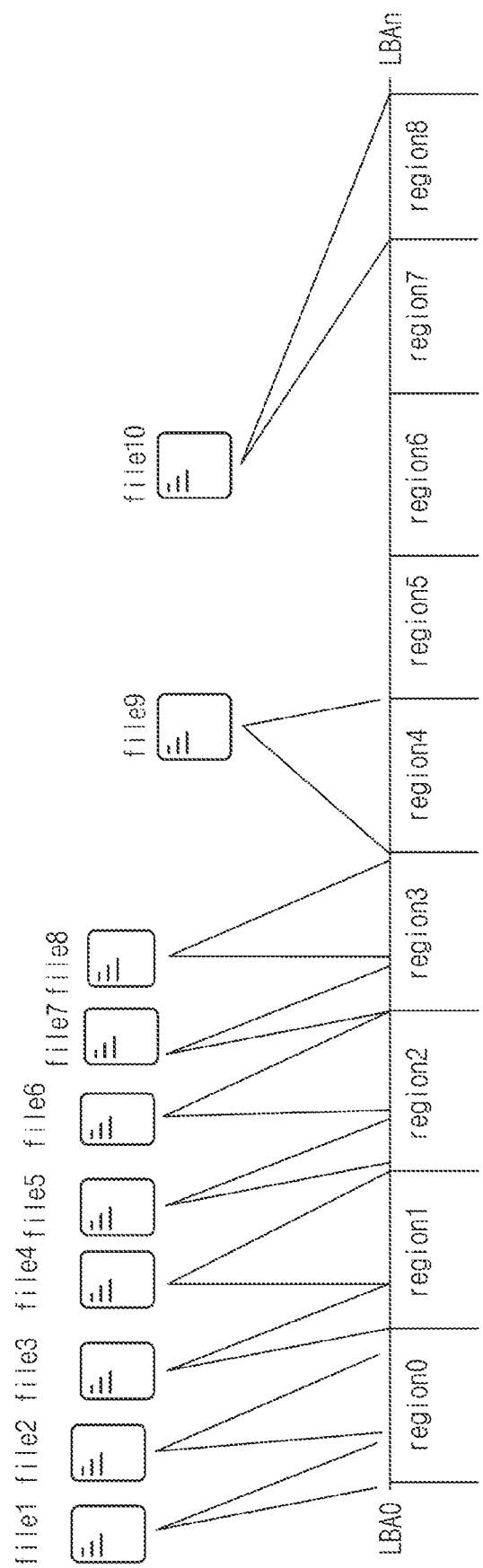
FIG. 5 is a schematic diagram illustrating a corresponding relationship between a UFS device storage region and a file, according to an exemplary embodiment of the present disclosure.

As shown in Table 2 above, the statistical analysis of the file size on the Android system shows that 99% of the file sizes are less than 4 M. In addition, the UFS device storage region may store 16 M of data. Accordingly, the UFS device storage region may store many files. The relationship between the file logical block address (LBA) and the physical address (e.g., the UFS physical page number) in the UFS device storage region may be established for each opened file, and may be maintained periodically. FIG. 5 is a schematic diagram illustrating a corresponding relationship between the UFS device storage region and the file, according to an exemplary embodiment of the present disclosure. As illustrated in FIG. 5, a LBA region corresponding to the UFS device storage region region0 contains two files, file1 and file2.

In addition, since the opened file will change with the use of the user and time, monitoring of the opened file may be maintained so as to periodically acquire the attributes of the at least one file currently opened. Steps S110~S120 may be repeated periodically according to a predetermined timing, and the attributes of the at least one file currently opened may be acquired periodically.

Figure 6:
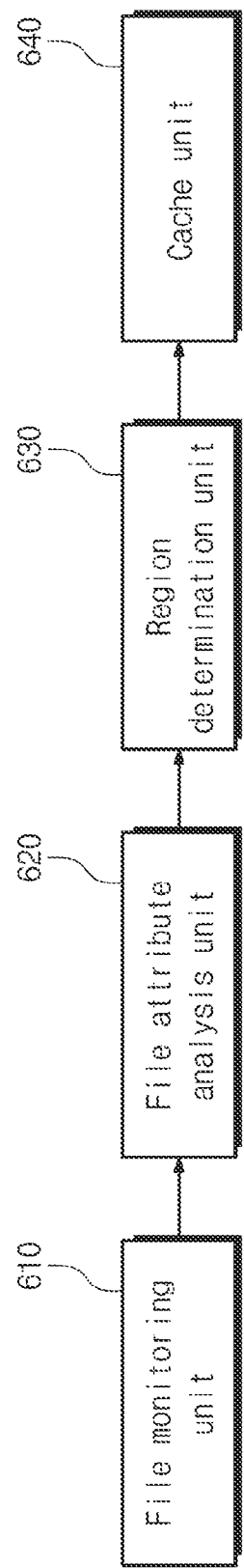
FIG. 6 is a block diagram illustrating a cache management device operating based on file attributes, according to an exemplary embodiment of the present disclosure.
Figure 7:
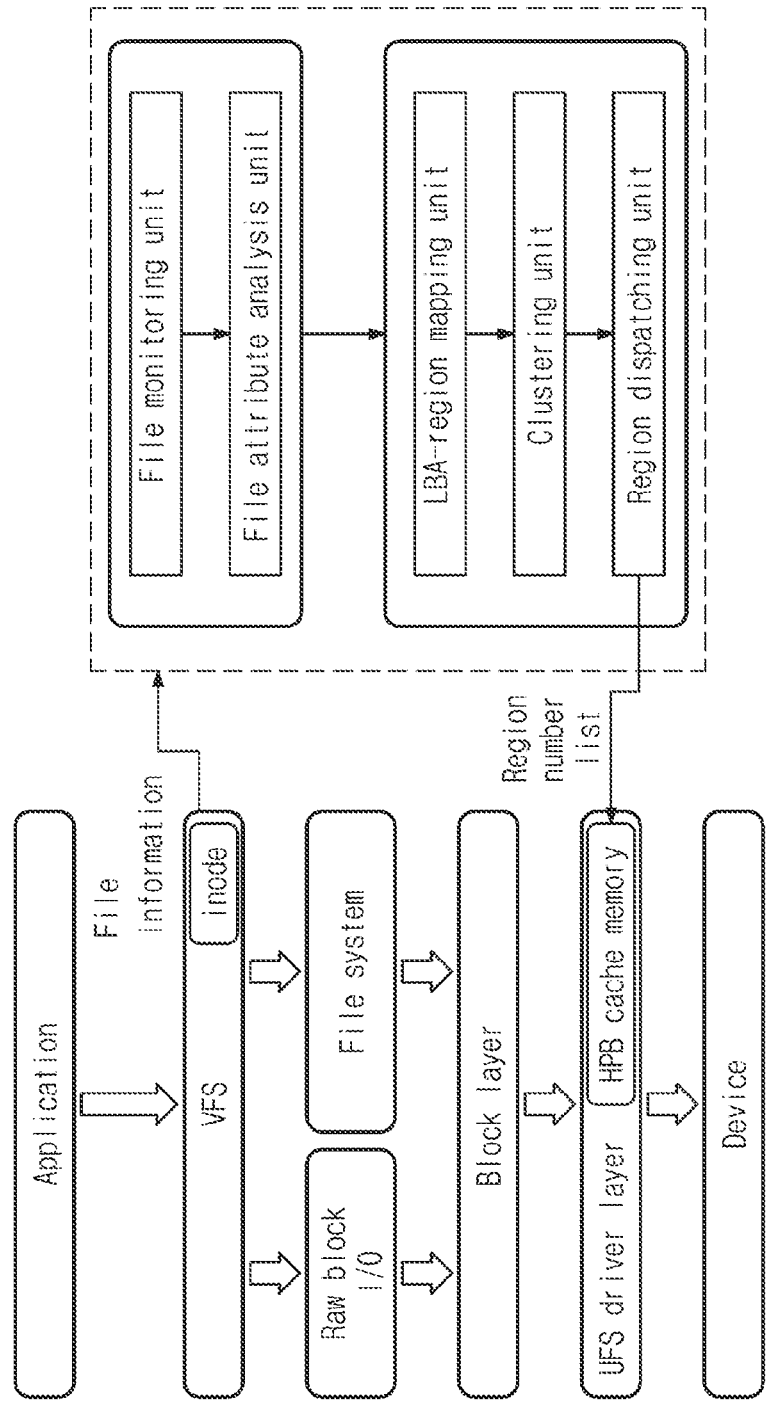
FIG. 7 is a schematic diagram illustrating a cache management device and a cache memory operating based on file attributes, according to an exemplary embodiment of the present disclosure.

FIG. 6 is a block diagram illustrating a cache management device operating based on file attributes, according to an exemplary embodiment of the present disclosure. FIG. 7 is a schematic diagram illustrating a cache management device and a cache memory operating based on file attributes, according to an exemplary embodiment of the present disclosure.

Referring to FIG. 6, the cache management device operating based on file attributes, according to an exemplary embodiment of the present disclosure may include a file monitoring unit 610, a file attribute analysis unit 620, a region determination unit 630, and a cache unit 640. An example of the cache management device in FIG. 6 is a server, and each of the units of the cache management device in FIG. 6 may be implemented with circuitry labelled as units. As is traditional in the field(s) of the inventive concept(s) described herein, examples may be described and illustrated in terms of such labelled elements which carry out a described function or functions. These labelled elements, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting such labelled elements may be implemented by dedicated hardware, or by a processor (e.g., one or more programmed microprocessors and associated circuitry), or by a combination of dedicated hardware to perform some functions of the labelled element and a processor to perform other functions of the labelled element. Each labelled element of the examples may be physically separated into two or more interacting and discrete circuits without departing from the scope of the present disclosure. Likewise, the labelled elements of the examples such as in the cache management device of FIG. 6 may be physically combined into more complex circuits without departing from the scope of the present disclosure.

The file monitoring unit 610 may acquire attributes of at least one file currently opened. Here, the file attribute table as described above may be created by the file monitoring unit 610, and the information of the opened file may be recorded in the file attribute table. The file monitoring unit may obtain the attributes of the at least one file currently opened, periodically.

The file attribute analysis unit 620 may extract a first attribute subset related to a predetermined analysis target from among the attributes of the at least one file. Here, the file attribute table as described above may be maintained by the file attribute analysis unit 620.

The region determination unit 630 may determine region numbers of corresponding UFS device storage regions to be cached based on the first attribute subset. More specifically, the region determination unit 630 may further perform the following operations: determining a second attribute subset of corresponding UFS device storage regions based on the first attribute subset, clustering the corresponding UFS device storage regions into at least one cluster based on the second attribute subset, and determining region numbers of the UFS device storage regions in a predetermined number of clusters with a high clustering center value as the region numbers of the corresponding UFS device storage regions to be cached. Accordingly, region numbers of UFS device storage regions with data of one or more open file(s) may be selectively determined for caching based on the attributes of the one or more open file(s) in the first attribute subset.

The cache unit 640 may cache data of the corresponding UFS device storage regions to be cached into the cache memory based on the region numbers. More specifically, the cache unit 640 may perform the following operations: generating a region prefetching command based on the region numbers of the corresponding UFS device storage regions to be cached, and dispatching the region prefetching command to the UFS device; dispatching the data to the UFS driver layer based on the region prefetching command; and storing the data into the UFS HPB cache memory. In addition, in a predetermined case, the cache unit 640 may also eliminate data which has been cached into the UFS HPB cache memory by using the data based on a predetermined elimination algorithm. It should be noted that the cache unit 640 may be an optional unit of the cache management device operating based on file attributes according to the exemplary embodiment of the present disclosure. As shown in FIG. 7, in the case of UFS HPB cache memory, corresponding functions of the cache unit 640 may be implemented by the UFS driver layer.

In addition, the cache management device operating based on file attributes according to the exemplary embodiment of the present disclosure may also include other units to implement functions corresponding to other steps of the method of cache management based on the file attributes according to the exemplary embodiment of the present disclosure respectively. For example, as shown in FIG. 7, the cache management device operating based on the file attributes according to the exemplary embodiment of the present disclosure may further include an LBA-region mapping unit, a clustering unit, and a region dispatching unit. The LBA-region mapping unit may be for establishing a corresponding relationship between the LBA and the UFS device storage region. The clustering unit may be for clustering. The region dispatching unit may be for dispatching the UFS device storage region list to the UFS drive layer, and the like. The UFS drive layer may generate a region prefetching command in the UFS HPB cache memory and dispatch the region prefetching command to the UFS device. After the prefetching command is received, the UFS device may dispatch a required region information to the UFS driver layer. The UFS driver layer may store the required region information into UFS HPB cache memory, which will not be repeatedly described.

In addition, according to an exemplary embodiment of the present disclosure, an electronic apparatus may also be provided. The electronic apparatus includes a storage on which computer executable instructions are stored, and a processor configured to execute the instructions. When the instructions are executed, the processor performs some or all aspects of method(s) described herein. According to an exemplary embodiment of the present disclosure, a computer-readable medium stores computer executable instructions. When the instructions are executed, one or more aspects of method(s) described herein are performed. In some embodiments, one or more of the units shown in and described with respect to FIG. 6 may be implemented using combinations of one or more processor and one or more storage which stores computer executable instructions executed by the processor(s).

According to an exemplary embodiment of the present disclosure, when the subsequent requested LBA address region falls into the prefetched UFS device storage region, the HPB cache hits, and the user data is directly accessed through the physical address identified through the physical page number (PPN) in the UFS device storage region information. This greatly shortens the time cost of obtaining the physical address, thereby improving the reading performance and user experience of the UFS device. Additionally, this does not require modifying the application or even the Linux kernel. That is, in the case of using the UFS driver layer containing HPB characteristics, no change is needed. The prefetching work of the UFS device storage region for various workloads may be automatically managed. The automatic identification of dynamic file access mode and the automatic management of the UFS device storage region under variable load may be implemented. The access sequence of the UFS device storage region within the future time window may be predicted according to the historical access information and pattern(s) of the UFS device storage region. The teachings herein may be adapted for a variety of workloads.

Although the inventive concept(s) described herein have been shown and explained with reference to the specific exemplary embodiments, those skilled in the art will understand that various changes in form and in detail may be made without departing from the spirit and scope of the present disclosure.

What is claimed is:

1. A method of cache management based on file attributes, comprising:

periodically acquiring attributes of at least one file currently opened as the at least one file currently opened changes with use by a user and time;

extracting a first attribute subset related to a predetermined analysis target from among the attributes of the at least one file;

determining region numbers of corresponding universal flash storage (UFS) device storage regions to be cached in a UFS device, based on the first attribute subset; and caching data of the corresponding UFS device storage regions to be cached into a cache memory, based on the region numbers, wherein determining the region numbers of the corresponding UFS device storage regions to be cached comprises:

determining a second attribute subset of the corresponding UFS device storage regions based on the first attribute subset;

clustering the corresponding UFS device storage regions to at least one cluster based on the second attribute subset, and determining region numbers of the UFS device storage regions in a predetermined number of clusters with a high clustering center value as the region numbers of the corresponding UFS device storage regions to be cached.

2. The method of cache management based on file attributes of claim 1, wherein the attributes of the at least one file comprise at least one of a file self attribute or a file event attribute.

3. The method of cache management based on file attributes of claim 1, wherein the predetermined analysis target is a file reading heat.

4. The method of cache management based on file attributes of claim 1, wherein the second attribute subset of each corresponding UFS device storage region comprises a number of files in the UFS device storage region, a number of read input output (IO) times of files in the UFS device storage region, and a cache probability estimation of an average file size in the UFS device storage region.

5. The method of cache management based on file attributes of claim 1, wherein the cache memory is a universal flash storage host performance booster (UFS HPB) cache memory.

6. The method of cache management based on file attributes of claim 5, wherein caching the data of the corresponding UFS device storage regions to be cached into the cache memory comprises:
generating a region prefetching command based on the region numbers of the corresponding UFS device storage regions to be cached, and dispatching the region prefetching command to the UFS device;
dispatching the data to a UFS driver layer based on the region prefetching command; and
storing the data into the UFS HPB cache memory.

7. The method of cache management based on file attributes of claim 6, wherein caching the data into the cache memory comprises: eliminating data which has been cached into the UFS HPB cache memory, based on a predetermined elimination algorithm in a predetermined case.

8. A cache management device operating based on file attributes, comprising:
a file monitoring unit, for periodically acquiring attributes of at least one file currently opened as the at least one file currently opened changes with use by a user and time;
a file attribute analysis unit, for extracting a first attribute subset related to a predetermined analysis target from among the attributes of the at least one file;
a region determination unit for determining region numbers of corresponding universal flash storage (UFS) device storage regions to be cached in a UFS device, based on the first attribute subset; and
a cache unit, for caching data of the corresponding UFS device storage regions to be cached into a cache memory, based on the region numbers,
wherein the region determination unit further:
determines a second attribute subset of the corresponding UFS device storage regions based on the first attribute subset;
clusters the corresponding UFS device storage regions to at least one cluster based on the second attribute subset; and
determines region numbers of the UFS device storage regions in a predetermined number of clusters with a high clustering center value as the region numbers of the corresponding UFS device storage regions to be cached.

9. The cache management device operating based on file attributes of claim 8, wherein the attributes of the at least one file comprise at least one of a file self attribute or a file event attribute.

10. The cache management device operating based on file attributes of claim 9, wherein the predetermined analysis target is a file reading heat.

11. The cache management device operating based on file attributes of claim 9, wherein the second attribute subset of each corresponding UFS device storage region comprises a number of files in the UFS device storage region, a number of read input output (IO) times of files in the UFS device storage region, and a cache probability estimation of an average file size in the UFS device storage region.

12. The cache management device operating based on file attributes of claim 9, wherein the cache memory is a universal flash storage host performance booster (UFS HPB) cache memory.

13. The cache management device operating based on file attributes of claim 12, wherein the cache unit further:
generates a region prefetching command based on the region numbers of the corresponding UFS device storage regions to be cached, and dispatching the region prefetching command to the UFS device;
dispatches the data to a UFS driver layer based on the region prefetching command; and
stores the data into the UFS HPB cache memory.

14. The cache management device operating based on file attributes of claim 13, wherein the cache unit further:
eliminates data which has been cached into the UFS HPB cache memory, based on a predetermined elimination algorithm in a predetermined case.

15. An electronic apparatus, comprising:
a storage on which computer executable instructions are stored, and
a processor that executes the instructions, wherein, when the instructions are executed by the processor, the electronic apparatus performs a method of cache management based on file attributes, including:
periodically acquiring attributes of at least one file currently opened as the at least one file currently opened changes with use by a user and time;
extracting a first attribute subset related to a predetermined analysis target from among the attributes of the at least one file;
determining region numbers of corresponding universal flash storage (UFS) device storage regions to be cached in a UFS device, based on the first attribute subset; and
caching data of the corresponding UFS device storage regions to be cached into a cache memory, based on the region numbers,
wherein determining the region numbers of the corresponding UFS device storage regions to be cached comprises:
determining a second attribute subset of the corresponding UFS device storage regions based on the first attribute subset;
clustering the corresponding UFS device storage regions to at least one cluster based on the second attribute subset, and
determining region numbers of the UFS device storage regions in a predetermined number of clusters with a high clustering center value as the region numbers of the corresponding UFS device storage regions to be cached.

* * * * *